United States Patent Office 3,269,977
Patented August 30, 1966

3,269,977
MOLDING COMPOSITION FROM A POLYESTER RESIN CONTAINING ANTHRACENE
Karlheinz Andres, Cologne-Flittard, and Günther Nischk, Leverkusen, Germany, assignors to Farbenfabriken Bayer Aktiengesellschaft, Leverkusen, Germany, a German corporation
No Drawing. Filed Aug. 22, 1961, Ser. No. 133,035
Claims priority, application Germany, Sept. 3, 1960, F 32,044
10 Claims. (Cl. 260—40)

The present invention relates to synthetic resin-bonded compositions on the basis of unsaturated polyester resins containing fibers or fillers and hardenable under pressure and heat in the presence of catalysts.

It is known to manufacture synthetic resin-bonded fibre structures which can be stored and which are hardenable under pressure and heat, more especially rovings, fabrics and mats consisting of glass fibres, by the use of polymerizable unsaturated polyesters as bonding agents, which contain diallyl phthalate as monomeric component. However, these structures or elements have the disadvantage that a tackiness occurs, which does not permit clean handling of the materials. In addition, the fact that the said diallyl compound is not relatively available industrially limits the use thereof in this process.

Experiments in which mixtures of unsaturated polyester resins with monomeric monoolefins, more especially styrene, have been used for the manufacture of the said structures or elements have until now not produced satisfactory results. The elements obtained in this manner either remained very tacky or they contained the bonding agent, after they had been heated for some time for ripening purposes to a temperature of 70–100° C., as an irreversible gel which no longer showed a satisfactory flow on being pressed at temperatures of about 100–120° C. and consequently could not be uniformly dispersed in the glass fibre insert.

The known incorporation of surface-active silicates, colloidal silicas and allied fillers, in the production of polyester-bonded structures containing fibres, also does not lead to satisfactory non-tacky surfaces. Furthermore, the combinations have an undesirably low viscosity prior to the hardening or curing thereof.

On the other hand, it has already been proposed to incorporate magnesium oxide into unsaturated polyester resins containing monomeric monoolefins. In this case, it is true that porous products with a non-tacky surface were obtained which are suitable for the manufacture of fiber-containing elements, but they have the disadvantage that owing to progressive cross-linking, only a comparatively short processing interval of about 14 days is available. After this interval, inhomogeneity phenomena occur in the pressed elements, produced by defective flow properties of the bonding agent. Finally, the material can no longer be pressed because of formation of an irreversible gel of the bonding agent.

It has now been found that the above disadvantages can be avoided by using, for the manufacture of the aforesaid elements, polymerizable mixtures which contain (1) a polymerizable linear polyester resin, (2) a copolymerizable vinylidene monomer, (3) magnesium oxide or beryllium oxide, and (4) an organic peroxide polymerization catalyst, wherein said polymerizable linear polyester resin comprises reaction products of (a) an $\alpha,\beta$-olefinically unsaturated dicarboxylic acid, with (b) an aliphatic dihydric alcohol containing at least one ether group, and with (c) anthracene, i.e. the linear polyester contains Diels-Alder-adducts of anthracene and $\alpha,\beta$-olefinically unsaturated dicarboxylic acids.

Suitable unsaturated polymerizable $\alpha,\beta$-olefinically unsaturated dicarboxylic acids which may be employed advantageously in preparation of the unsaturated (polymerizable) polyester resin are the aliphatic 1,2-dicarboxylic acids of that type, for example maleic acid or its anhydride or fumaric acid, but it is obviously also possible to employ other unsaturated dicarboxylic acids or their anhydrides as for example itaconic acid, as well as mixtures thereof with the aforesaid dicarboxylic acids.

Other non-polymerizable (i.e. saturated or aromatic) dicarboxylic acids, such as phthalic, hexahydrophthalic, terephthalic, adipic, succinic and similar acids, can also be employed for modifying these polyesters, in the manner in which they have already been used for a relatively long time for modifying unsaturated polyester resins. However, non-polymerizable dicarboxylic acids should be used in an amount not exceeding a molar ratio of 3 moles non-polymerizable acid per 1 mol of unsaturated dicarboxylic acid.

The polyesters to be used for the process according to the invention must contain as their alcohol component aliphatic dihydric alcohols containing at least one ether group, such as diethylene glycol, and triethylene glycol as well as the corresponding higher homologues, dipropylene glycol, tripropylene glycol and its homologues, glycerin monoallylether, $\omega,\omega'$-dihydroxy-dibutylether, bis-(hydroxyethoxy)-butane-(1,4), 4-(hydroxyethoxy)-n-butanol, 1,1,1-trimethylolpropane - monoallylether, 1,1,1 - trimethylolpropane-monobenzylether, pentaerythritol - diallylether, and pentaerythritol-dibenzylether as well as compounds of similar structure.

In addition, other primary or secondary diols without ether groupings, such as ethylene glycol, propylene-1,2-glycol, propylene-1,3-glycol, butane-1,3-diol, 2,2'-dimethylpropane-1,3-diol can be used in combination with these alcohols. Furthermore, alcohols of the type of bishydroxyethoxy - 4,4' - dihydroxydiphenylpropane and also of the type of hydroxyethoxy-4,4'-dihydroxydiphenyl sulphone as well as cycloaliphatic diols, 1,1'-dimethylol-3-cyclohexene or 1,2-dimethylolendomethylene-4-bicycloheptene are to be mentioned as examples of the latter group. The latter group of alcohols, i.e. alcohols without ether grouping may replace the dihydric alcohols having an ether group to a certain extent, but not more than 80% by weight of the ether group containing diol.

The anthracene to be used according to the present invention can also be replaced by substitution products of anthracene for example, 9,10-dichloranthracene, 2,3- or 2,4-dimethylanthracene, 9-ethylanthracene or mixtures of these compounds.

The unsaturated polyesters, especially the modification products, are prepared in a manner known by esterifying the components, advantageously in equimolar quantities, if necessary also with the use of a moderate excess (about 20% by weight) of diol, or on the other hand if desired with the use of a moderate excess of dicarboxylic acid (about 20% by weight), and esterification temperatures of 150–200° C. and advantageously 180° C. are to be considered. The esterification preferably takes place in an inert gas atmosphere (as for example nitrogen), and depending on special circumstances, with or without known solvents and with or without known catalysts.

According to one feature of the present invention, there are to be employed polyesters which represent Diels-Alder adducts of anthracene or its derivatives with olefinic unsaturations of these polyesters. For the production of these special modified polyesters, it is possible to proceed in such a way that one or more Diels-Alder adducts of the monomeric unsaturated compounds, more especially dicarboxylic acids, are concurrently used in the polyesterification. On the other hand, however, the anthracene can be reacted with the dienophilic groupings of the polyester, i.e. the olefinically unsaturation of the α,β-unsaturated dicarboxylic acids during or after the production of the latter, by anthracene or its derivatives being added in the suitable required quantities to the condensation batch from the outset or after splitting off the main quantity of the water of condensation, the addition being produced by heating to temperatures above 100° C., advantageously 150–200° C. The molar ratio between anthracene and unsaturated dicarboxylic acid is in these cases to be within the limits of 1:20 and 1:8.

Within the scope of the present invention, furthermore it is possible to effect conventional variations in the production of unsaturated polyesters, for example, to use in addition to the dihydric alcohols minor quantities of monoalcohols or mixtures of monoalcohols and polyalcohols in the esterification. Moreover, a modification of these polyesters by use of halogen-containing components is also readily possible, for which purpose there can be used, for example, tetrachlorophthalic acid or hexachloroendomethylene tetrahydrophthalic acid as well as phosphorus-containing components.

The said modified unsaturated polyesters are capable of being copolymerized with vinylidene monomers, i.e. more especially vinyl and/or allyl compounds. Monomers of said types are for example styrene, alkylated styrenes, styrenes halogenated on the nucleus, acrylic and methacrylic acid esters, vinyl esters, and also phthalic acid diallyl ester, triallyl cyanurate and similar compounds, which can be used separately or in admixture with one another. The proportion of the vinyl or allyl monomers is to be within the usual limits, i.e. about 20–50% of the total mixture.

According to another characteristic of the present invention the said mixtures of modified unsaturated polyesters and vinylidene monomers are to be used in combination with magnesium oxide, beryllium oxide or mixtures thereof. These alkaline-earth metal oxides are used in quantities of 0.3–10% by weight, calculated on the mixture of unsaturated polyester and monomeric olefin compound. In contrast to other alkaline earth metal oxides these two special oxides show specific effects when added to the polyester-monomer mixture. These are: a thickening effect on the polyester-monomer mixture; also the possibility of producing polyester resin impregnated reinforced materials which are free from tackiness, but which are sufficiently capable of flowing when pressed.

Finally the polymerizable mixtures of this invention contain a free radical-forming polymerization catalyst. In principle it is possible to use substances generally used as catalysts for polymerizing unsaturated polyester/vinyl monomer mixtures, such as benzoyl peroxide, methylethyl ketone peroxide, and the like.

However in order to obtain polyester-monomer mixtures having a long storage time, it is advantageous to use organic peroxides which initiate polymerization at temperatures above 100° C. Peroxides of this type are for example di-tert.-butyl peroxide, tert.-butyl hydroperoxide, 2,2-bis(-tert.-butylperoxy)-butane and tert.-butyl perbenzoate, cumene hydroperoxide, and dicumyl peroxide. These peroxides are added in quantities of about 0.5 to 5%.

The mixtures prepared in the manner described are especially suitable for the initial impregnation of reinforcing elements, such as asbestos, jute and sisal fibers or fibrous products, but especially for glass fiber rovings, mats and fabrics. The prepared resin mixture is applied by dipping, spraying, doctoring or casting on to the material to be impregnated and it is then if necessary squeezed or wrung between two rollers for the uniform distribution of the binder in the insert.

The resin content of the fiber-reinforced finished component can be between 20 and 90%, but advantageously the content of glass fibers is for example up to about 50% to 60%.

Furthermore, the resin mixtures can have additionally incorporated therein inorganic fillers, such as chalk, talcum, gypsum, and heavy spar, calcium oxide, zinc oxide, zinc carbonate etc., dyestuff pigments and also ground shale, in quantities of about 20–200%, based on the proportion of resin.

The initially impregnated materials, immediately after they have been made, can be subjected for a period of time to temperatures of 50–120° C., for example 15–20 minutes at 60° C. if it is desired that the conditions suitable for processing should be more quickly obtained, i.e. the condition in which viscosity is increased and the material is non-tacky.

For the production of prepared elements, the initially impregnated material is cut out to correspond to the shape of the required component, where impregnated glass fiber mats and fabrics are concerned, and pressed in steel molds at temperatures of about 80–150° C. at low pressures (a maximum of 10 kg./cm.$^2$). The pressing time is 2–10 minutes. In the case of molding compositions consisting of sections of glass fiber rovings, the material is placed in the mold as an agglomerated mass corresponding to the weight of the finished component and suitably pressed. In addition to pressings, it is also possible to fabricate conical and cylindrical tubes from initially impregnated glass fiber fabrics by winding this material on to mandrels and thereafter effecting curing at temperatures of 80–150° C.

The initially impregnated materials prepared by the present process and based on the specially modified unsaturated polyesters according to the invention in combination with vinyl monomers and alkaline-earth oxides have an especially unexpected technical advance, which is a considerable lengthening of the storage time of the initially impregnated materials, but especially the industrially interesting processing time interval, i.e. the period of time between completing the ripening of the mixture and the commencement of the gel formation. This processing time interval, which was extremely low with the prior known processes, i.e. in the range of magnitude from a few days up to a maximum of 2 weeks can be increased according to the present invention to approximately 3–6 months.

The mechanical strength values of the products thus obtained correspond at least to those which are required of a conventional glass fiber-reinforced polyester resin and in some cases even show better values.

Further details concerning the invention will be shown by the following examples, in which the parts indicated are parts by weight.

Furthermore, often the above-mentioned resin mixtures should contain up to 0.01% by weight (based upon the weight of the polyester resin and the vinylidene monomer) of a polymerization inhibitor, such as hydroquinone, copper resinate, cuprous chloride, etc.

*Example 1*

2 parts of tert.-butylperbenzoate paste (50% in dimethyl phthalate) and 3 parts of magnesium oxide are incorporated by stirring into a mixture of 70 parts of an unsaturated polyester prepared from 384 parts of fumaric acid, 399 parts of phthalic acid, 195 parts of glycol, 330 parts of diglycol and 54 parts of anthracene, and 30 parts of styrene. This mixture is applied by doctoring to glass fiber mats or fabrics, which are then wrung out between two rubber rollers. The bonding agent is in this way uniformly distributed in the insert.

Thereafter the material is subjected to a subsequent heat treatment for 4 hours at 70° C. It then has no surface tackiness and can then be pressed immediately, or after the thickening process has stopped (about 4 days) at about 120° C. in 2–5 minutes, depending on the wall thickness of the finished component.

Example 2

100 parts of the polyester-styrene mixture described in Example 1 are mixed with 2 parts of tert.-butyl perbenzoate paste (50% in dimethyl phthalate), 1.5 parts of magnesium oxide and 100 parts of chalk. Endless glass fiber rovings are drawn through the mixture thus prepared, the rovings then passing through an oven heated to 90° C. so that the residence time is about 15 minutes. They then pass to a cutting unit for cutting purposes, sections with a length of about 2 cm. being obtained. The molding composition thereby obtained can be pressed immediately or after the thickening process has ended (about 5 days), at 120° C. in 2–5 minutes.

Example 3

2 parts of di-tert.-butyl peroxide and 6 parts of magnesium oxide are incorporated by stirring 30 parts of styrene into a mixture of 70 parts of an unsaturated polyester prepared from 1136 parts of fumaric acid, 444 parts of 1,3-butylene glycol, 650 parts of dipropylene glycol and 83 parts of anthracene. This mixture is applied by doctoring to glass fiber mats or fabrics, which are then wrung out between two rubber rollers. The bonding agent is in this way uniformly distributed. The material is thereafter subjected to a heat treatment for 4 hours at 70° C. It no longer has any surface tackiness and can be pressed immediately or after completion of the thickening process (about 4 days) at 130° C. in 2–5 minutes.

Example 4

100 parts of the polyester-styrene mixture described in Example 3 are mixed with 2 parts of di-tert.-butyl peroxide, 2 parts of magnesium oxide and 100 parts of chalk. Endless glass fiber rovings are then drawn through the mixture thus prepared, the said rovings thereafter being wound between cellophane on a roller. A thermal after-treatment lasting 5 hours at 60° C. is then carried out. After cutting the material into sections with a length of about 2 cm., the molding composition can be pressed immediately or after the thickening process has ended (about 3 days) at 130° C. in 2–5 minutes.

Example 5

2 parts of tert.-butyl perbenzoate paste (50% in dimethyl phthalate) and 4 parts of beryllium oxide are incorporated by stirring 40 parts of styrene into a mixture of 60 parts of an unsaturated polyester, prepared from 1020 parts of fumaric acid, 1264 parts of the reaction product of 1 mol of 4,4'-dihydroxydiphenyl dimethylmethane and 2 mols of ethylene oxide, 470 parts of diglycol and 142 parts of anthracene. This mixture is applied by doctoring to glass fiber mats or fabrics and then it is wrung out between two rubber rollers, whereby the bonding agent is uniformly distributed in the material. The material is thereafter subjected to heat treatment for 4 hours at 70°C. It then no longer shows any surface tackiness and can be pressed immediately or after completion of the thickening process (about 5 days), at 120° C. in 2–5 minutes.

Example 6

100 parts of the polyester-styrene mixture described in Example 5 are mixed with 2 parts of tert.-butyl perbenzoate paste (50% in dimethyl phthalate), 2.5 parts of beryllium oxide and 100 parts of chalk. The endless glass fiber rovings are then drawn through the mixture thus prepared and are thereafter wound between cellophane on to a roller. A thermal after-treatment then takes place, this lasting 5 hours at 60°C. After cutting the material into sections with a length of about 2 cm., the molding composition thus obtained can be pressed immediately or after completing the thickening process (about 5 days) at 120°C. in 2–5 minutes.

Example 7

2 parts of dicumyl peroxide paste (50% in dimethyl phthalate) and 2 parts of beryllium oxide are incorporated, by stirring, into a mixture of 60 parts of an unsaturated polyester prepared from 980 parts of maleic acid anhydride, 1480 parts of phthalic acid anhydride, 670 parts of glycol, 1500 parts of triethylene glycol and 180 parts of anthracene, and a mixture consisting of 20 parts of styrene, 10 parts of diallylphthalate and 10 parts of vinyltoluene. This mixture is applied by doctoring to glass fiber mats or fabrics, which are then wrung out between two rubber rollers. The bonding agent is in this way uniformly distributed in the insert.

Thereafter, the material is subjected to a subsequent heat treatment for 3½ hours at 75° C. It then has no surface tackiness and can then be pressed immediately, or after the thickening process has stopped (about 4 days) at about 120° C. in 2–5 minutes, depending on the wall thickness of the finished component.

What we claim is:

1. A storage-stable polymerizable mixture comprising (1) a polymerizable linear polyester resin, comprised of the reaction product of (a) an $\alpha,\beta$-olefinically unsaturated dicarboxylic acid with (b) an aliphatic dihydric alcohol containing from 1 to 3 ether groups, and with (c) anthracene, the molar ratio between anthracene and $\alpha,\beta$-unsaturated dicarboxylic acid being within 1:20 and 1:8, (2) a copolymerizable vinylidene monomer, (3) a metal oxide selected from the group consisting of magnesium oxide and beryllium oxide in an amount of from 0.3 to 10% by weight, based on the total amount of polymerizable linear polyester resin and vinylidene monomer, and (4) an organic peroxide polymerization catalyst.

2. An infusible, insoluble resinous composition prepared by the polymerization of a mixture comprising (1) a polymerizable linear polyester resin, comprised of the reaction product of (a) an alpha,beta-olefinically unsaturated dicarboxylic acid, with (b) an aliphatic dihydric alcohol containing from 1 to 3 ether groups, and with (c) anthracene, the molar ratio between anthracene and alpha,beta-unsaturated dicarboxylic acid being within 1:20 and 1:8, (2) a copolymerizable vinylidene monomer, (3) a metal oxide selected from the group consisting of magnesium oxide and beryllium oxide in an amount of from 0.3–10% by weight, based on the total amount of polymerizable linear polyester resin and vinylidene monomer, and (4) an organic peroxide polymerization catalyst.

3. The composition of claim 2 wherein said mixture contains an inert filler.

4. A plastic article prepared by reinforcing the infusible, insoluble resinous composition of claim 2 with a fibrous reinforcing material.

5. The polymerizable mixture of claim 1 wherein said polymerizable linear polyester resin is obtained by reacting the anthracene with said $\alpha,\beta$-olefinically unsaturated dicarboxylic acid during preparation of the linear polyester.

6. The polymerizable mixture of claim 1 wherein said organic peroxide catalyst is an organic peroxide which initiates polymerization of said linear polyester/vinylidene monomer mixture at temperatures above 100° C.

7. A polymerizable mixture comprising (1) a polymerizable linear polyester resin which comprises the reaction product of (a) an alpha,beta-olefinically unsaturated dicarboxylic acid selected from the group consisting of maleic acid, maleic acid anhydride and fumaric acid, with (b) equimolar amounts, up to a 20% by weight excess, of an aliphatic dihydric alcohol selected from the group consisting of diethylene glycol, triethylene glycol and dipropylene glycol, and (c) anthracene, the molar ratio between anthracene and said alpha,beta-unsaturated dicarboxylic acid being from 1:20 to 1:8, (2) 20–50%, based on the weight of the total mixture, of a copolymerizable vinylidene monomer, (3) a metal oxide selected from the group consisting of magnesium oxide and beryllium oxide in an amount of from 0.3–10% by weight, based on the total amount of polyester resin and vinylidene monomer, and (4) 0.5–5% by weight of an organic peroxide polymerization catalyst capable of initiating polymerization of the mixture at temperatures above 100° C.

8. The polymerizable mixture of claim 7 wherein said copolymerizable vinylidene monomer is styrene, and the organic peroxide polymerization catalyst is a member selected from the group consisting of di-tert.-butyl peroxide, tert.-butyl hydroperoxide, 2,2-bis(tert.-butylperoxy)-butane, tert.-butyl perbenzoate, cumene hydroperoxide, dicumyl peroxide.

9. The polymerizable mixture of claim 7 which additionally contains a glass fiber material in such an amount that said linear polyester resin constitutes between 20 and 90% of the total mixture.

10. A reinforced plastic article by polymerizing the composition of claim 9 to an infusible, insoluble resinous composition by applying thereto pressures of up to 10 kg./cm.$^2$ and heating it to a temperature of 80–150° C.

References Cited by the Examiner

UNITED STATES PATENTS

| | | |
|---|---|---|
| 2,475,731 | 7/1949 | Weith. |
| 2,623,025 | 12/1952 | Dearing et al. _____ 260—40 |
| 2,628,209 | 2/1953 | Fisk _____ 260—40 |
| 2,928,801 | 3/1960 | Safford et al. _____ 260—94.9 |
| 2,973,332 | 2/1961 | Fikentscher et al. |

OTHER REFERENCES

Chemical Abstracts 53, 8708f (1959) (abstract of Japanese Patent 9589) (1957).

"Chemistry of Synthetic Resins," Ellis, vol. 1, 1935, Reinhold, p. 242.

Japenese patent application pub., 33–5848 July 1958; Akita et al.; 4 pp., translation in 260–75A, 12 pp.

"Organic Chemistry," Fieser et al., third ed., 1956, Reinhold, p. 760.

MORRIS LIEBMAN, *Primary Examiner.*

MILTON STERMAN, *Examiner.*

A. H. KOECKERT, *Assistant Examiner.*